(12) United States Patent
Hackett et al.

(10) Patent No.: US 8,425,249 B2
(45) Date of Patent: Apr. 23, 2013

(54) BLOCKOUT DEVICE FOR USB PORT

(75) Inventors: Jason O. Hackett, Canton, GA (US); Michael Scott Adams, Cumming, GA (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 13/192,212

(22) Filed: Jul. 27, 2011

(65) Prior Publication Data

US 2013/0029505 A1 Jan. 31, 2013

(51) Int. Cl.
*H01R 13/625* (2006.01)
(52) U.S. Cl.
USPC .......................................................... 439/357
(58) Field of Classification Search .................. 439/135, 439/607.01, 607.35, 357, 660; 29/5–532
See application file for complete search history.

(56) References Cited

U.S. PATENT DOCUMENTS

| | | | |
|---|---|---|---|
| 3,317,989 A | 5/1967 | Cull | |
| 3,443,297 A | 5/1969 | Lusby, Jr. | |
| 3,570,096 A | 3/1971 | Sosinski | |
| 4,155,159 A | 5/1979 | Hogan et al. | |
| 4,781,408 A | 11/1988 | Hernandez | |
| 6,139,350 A | 10/2000 | Mathesius | |
| 6,991,479 B2 | 1/2006 | Miao | |
| 7,014,490 B1 | 3/2006 | Morikawa et al. | |
| 7,094,099 B2 | 8/2006 | Daggett et al. | |
| 7,428,834 B1 | 9/2008 | Lee | |
| 7,462,045 B1 | 12/2008 | Lee | |
| 7,465,181 B1 | 12/2008 | Bridges et al. | |
| 7,479,021 B2 | 1/2009 | Huang | |
| 7,484,991 B1 | 2/2009 | Kelaher et al. | |
| 7,578,691 B2 | 8/2009 | Weksler et al. | |
| 7,581,417 B1 | 9/2009 | Chen | |
| 7,635,272 B2 | 12/2009 | Poppe | |
| 7,677,065 B1 | 3/2010 | Miao | |
| 7,794,245 B2 | 9/2010 | Thompson | |
| 7,794,284 B1 * | 9/2010 | He et al. | 439/660 |
| 7,878,865 B2 | 2/2011 | Desrosiers et al. | |
| 7,883,370 B2 * | 2/2011 | Ting et al. | 439/607.35 |
| 7,913,527 B2 | 3/2011 | Chen | |
| 7,997,922 B2 * | 8/2011 | Dawiedczyk et al. | 439/357 |
| 8,007,307 B2 * | 8/2011 | Wang | 439/367 |
| 8,162,672 B2 * | 4/2012 | Huang | 439/63 |
| 2002/0013076 A1 * | 1/2002 | Akeda et al. | 439/135 |
| 2005/0039502 A1 | 2/2005 | Avganim | |
| 2007/0011857 A1 * | 1/2007 | Francis et al. | 29/426.5 |

\* cited by examiner

*Primary Examiner* — Jean F Duverne
(74) *Attorney, Agent, or Firm* — Robert A. McCann; Christopher S. Clancy; Aimee E. McVady

(57) ABSTRACT

A blockout device for a USB port is disclosed. The blockout device prevents contamination, damage or misuse of the USB port when not in use. The blockout device includes a locking member, a body member and a shell. The locking member has a bottom and a top. The bottom of the locking member includes a plurality of teeth for engaging the USB port. The body member has a top, a bottom and sides defining a channel therein. The locking member is positioned within the channel of the body. The shell has a cavity that receives the locking member and the body member. The locking member and the body member are positioned within the cavity of the shell when the blockout device is installed in the USB port.

13 Claims, 13 Drawing Sheets

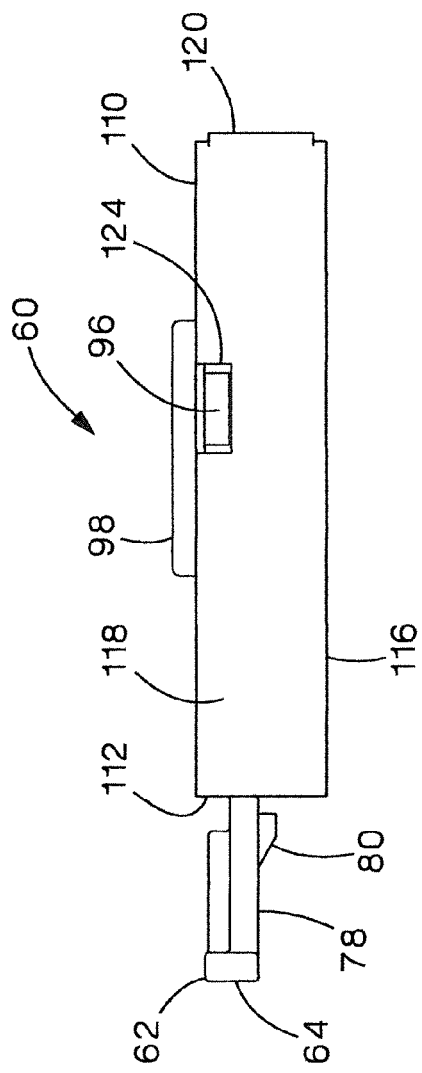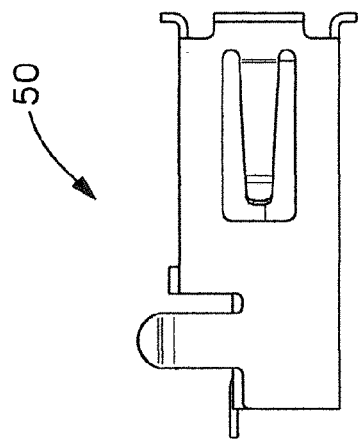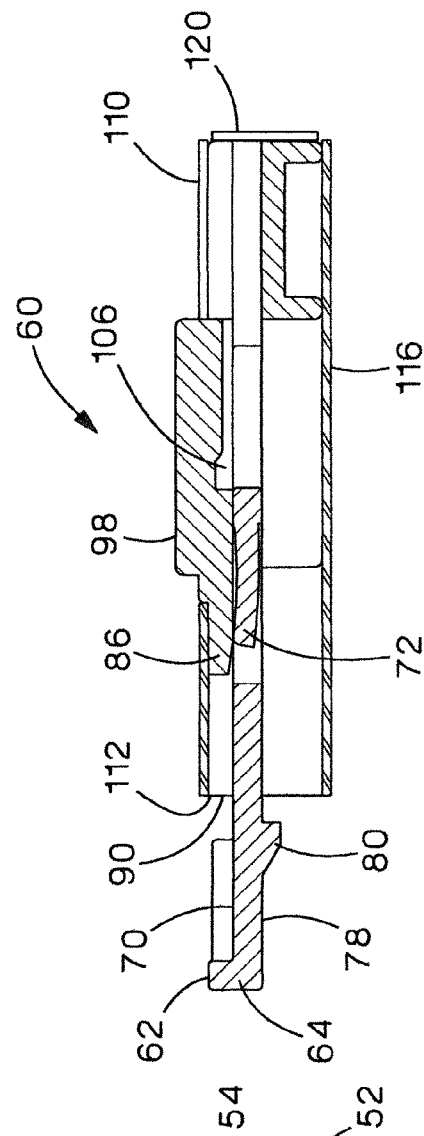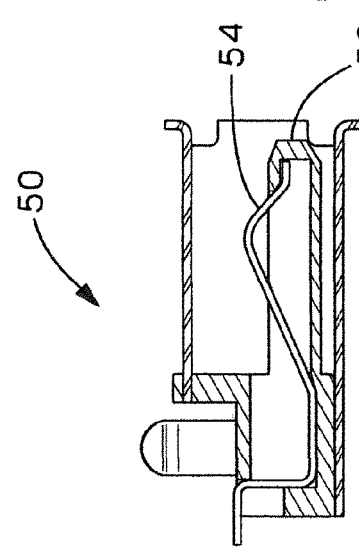
FIG.9
FIG.10

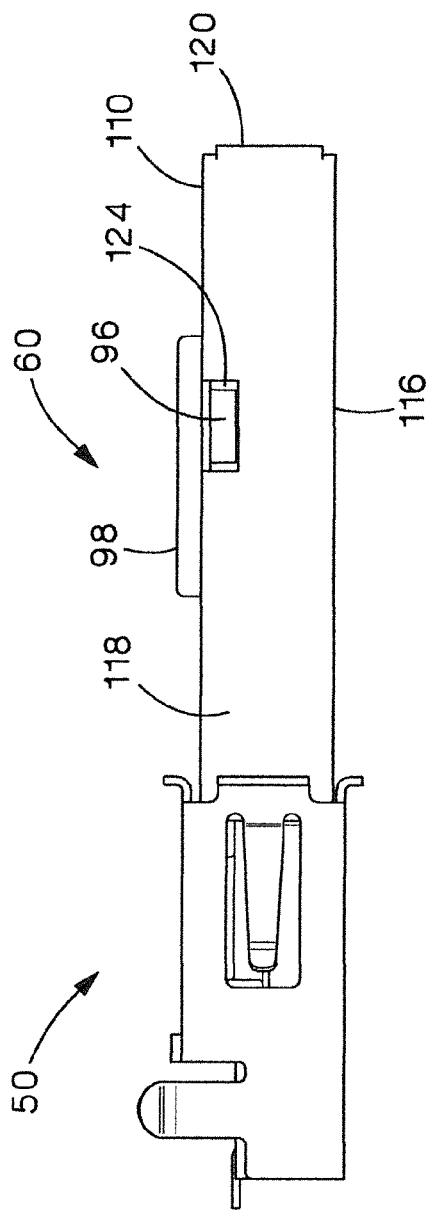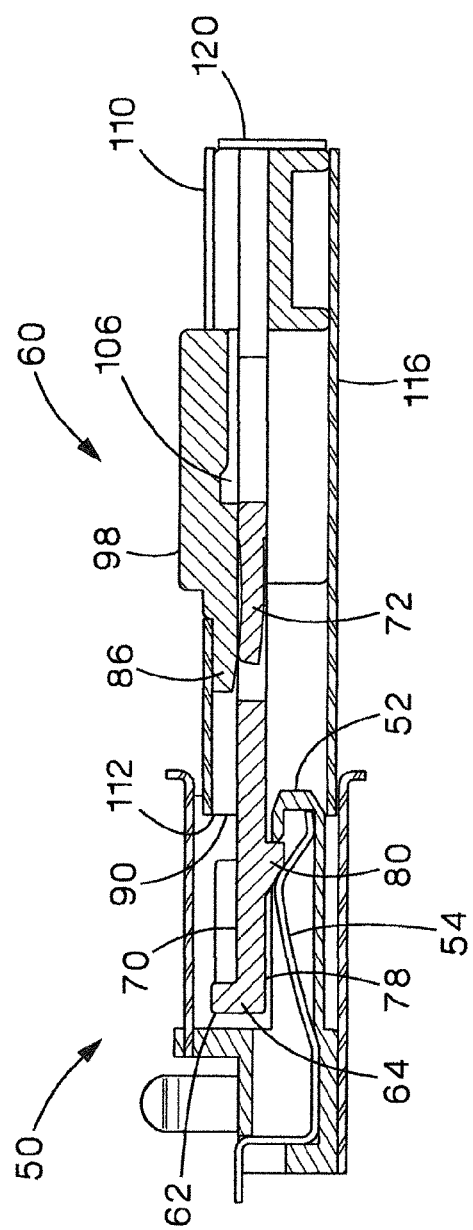

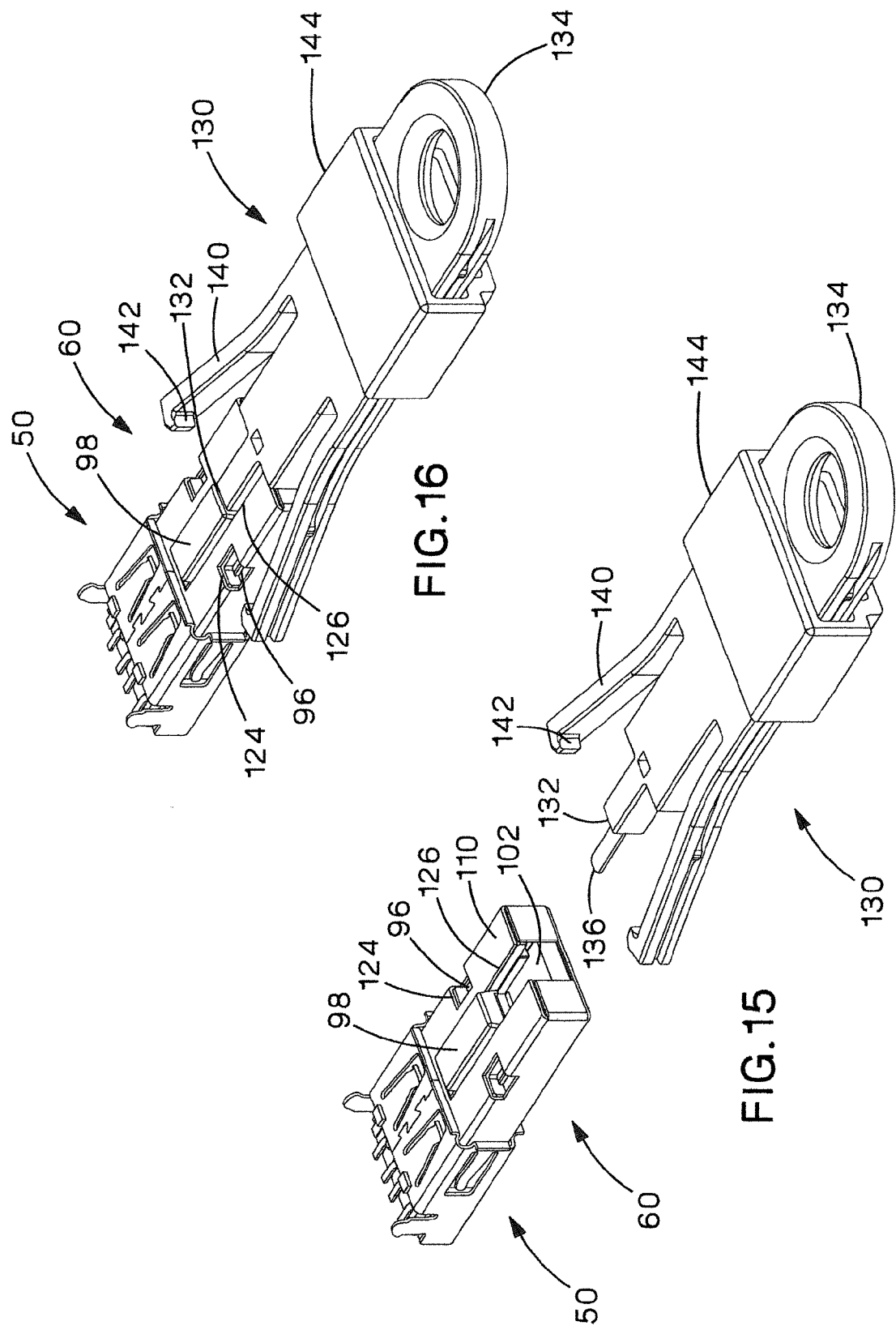

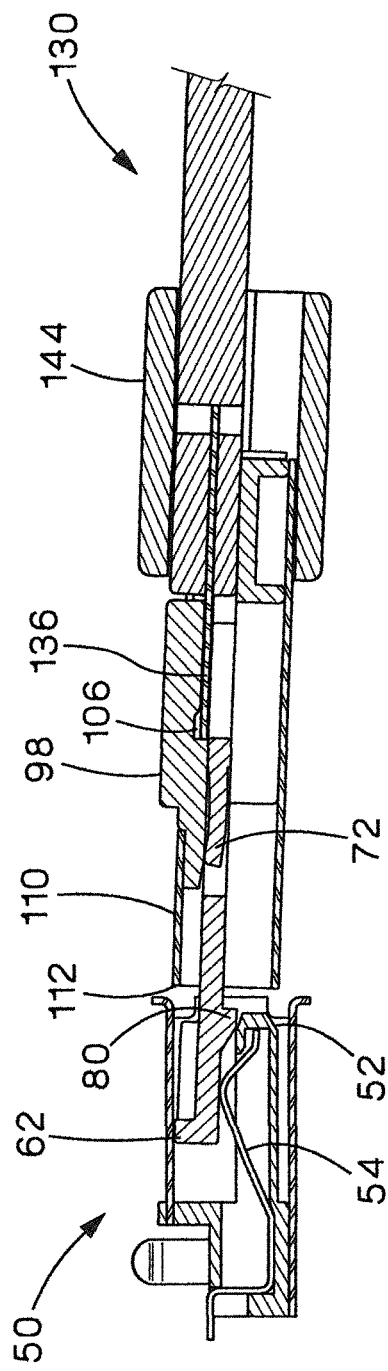
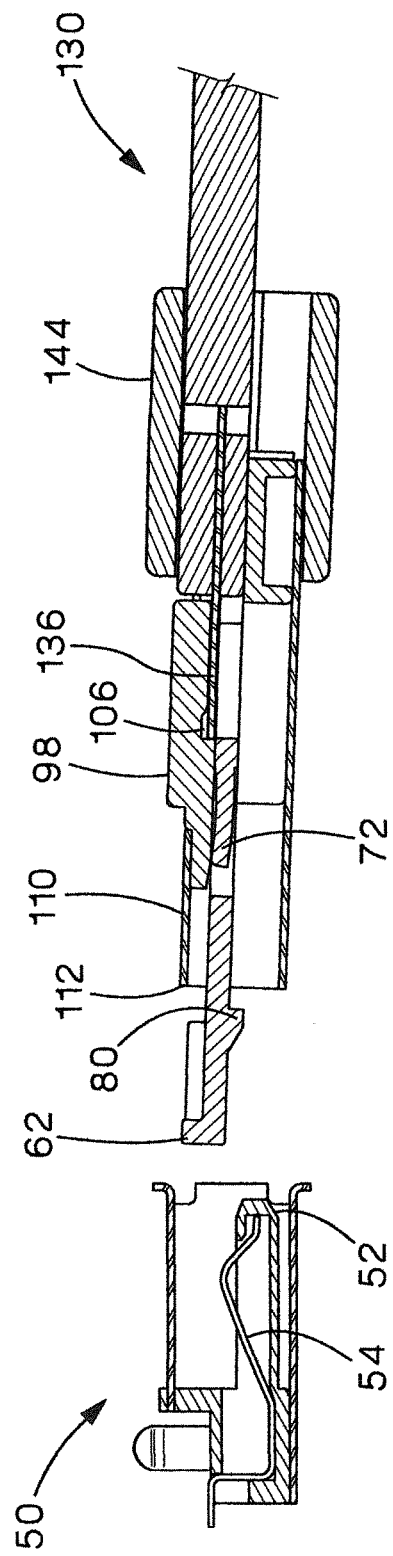

BLOCKOUT DEVICE FOR USB PORT

FIELD OF THE INVENTION

The present invention relates to a blockout device, and more particularly to a blockout device for a USB port for preventing contamination, damage or misuse of the USB port when not in use.

BACKGROUND OF THE INVENTION

A USB receptacle is a common data port located on electronics devices, e.g. computers and laptops. With the widespread use of USB ports, it has become a high priority to provide security to the data available via the USB port. Therefore it is important to protect and lock the USB port from contamination, damage or misuse. A USB port lock device is typically inserted in the USB port when the port is not in use to protect the port and to prevent unauthorized access to the port. Prior USB port lock devices engage the openings on the top side of the USB port. However, the prior port lock devices are not compatible with all USB ports since the top side of the USB port doesn't always include openings. Even though prior lock devices cover the USB port, the devices fail to provide a tamper resistant blockout device that securely locks all USB ports.

Thus, it would be desirable to provide an improved tamper resistant blockout device that secures the USB data port when not in use until the blockout device has been removed with a custom removal tool.

SUMMARY OF THE INVENTION

The present invention is directed to a blockout device designed to prevent contamination, damage or misuse of a USB port when not in use. The blockout device includes a locking member, a body member and a shell. The locking member has a bottom and a top. The bottom of the locking member includes a plurality of teeth that engage the USB port when the device is installed in the USB port. The body member has a top, a bottom and sides that define a channel therein. The channel of the body member receives the locking member. The shell includes a cavity that receives the locking member and the body member. The locking member and the body member are positioned within the cavity of the shell when the blockout device is installed in the USB port. The blockout device secures the USB port until the blockout device is removed by a removal tool.

BRIEF DESCRIPTION OF THE DRAWINGS

FIG. 9 is a side view of the USB blockout device of FIG. 6 positioned to be installed in a USB port.

FIG. 10 is a cross sectional view of the USB blockout device of FIG. 9 positioned to be installed in the USB port.

FIG. 11 is a side view of the USB blockout device of FIG. 9 inserted in the USB port.

FIG. 12 is a cross sectional view of the USB blockout device of FIG. 11 inserted in the USB port.

FIG. 15 is a top perspective view of the USB blockout device of FIG. 13 completely installed in the USB port with the removal tool positioned to be inserted in the USB blockout device.

FIG. 16 is a top perspective view of the USB blockout device of FIG. 15 completely installed in the USB port with the removal tool inserted in the USB blockout device.

FIG. 19 is a cross sectional view of the USB blockout device of FIG. 17 being removed from the USB port by the removal tool.

FIG. 20 is a cross sectional view of the USB blockout device of FIG. 17 removed from the USB port by the removal tool.

DETAILED DESCRIPTION

Figure 1:
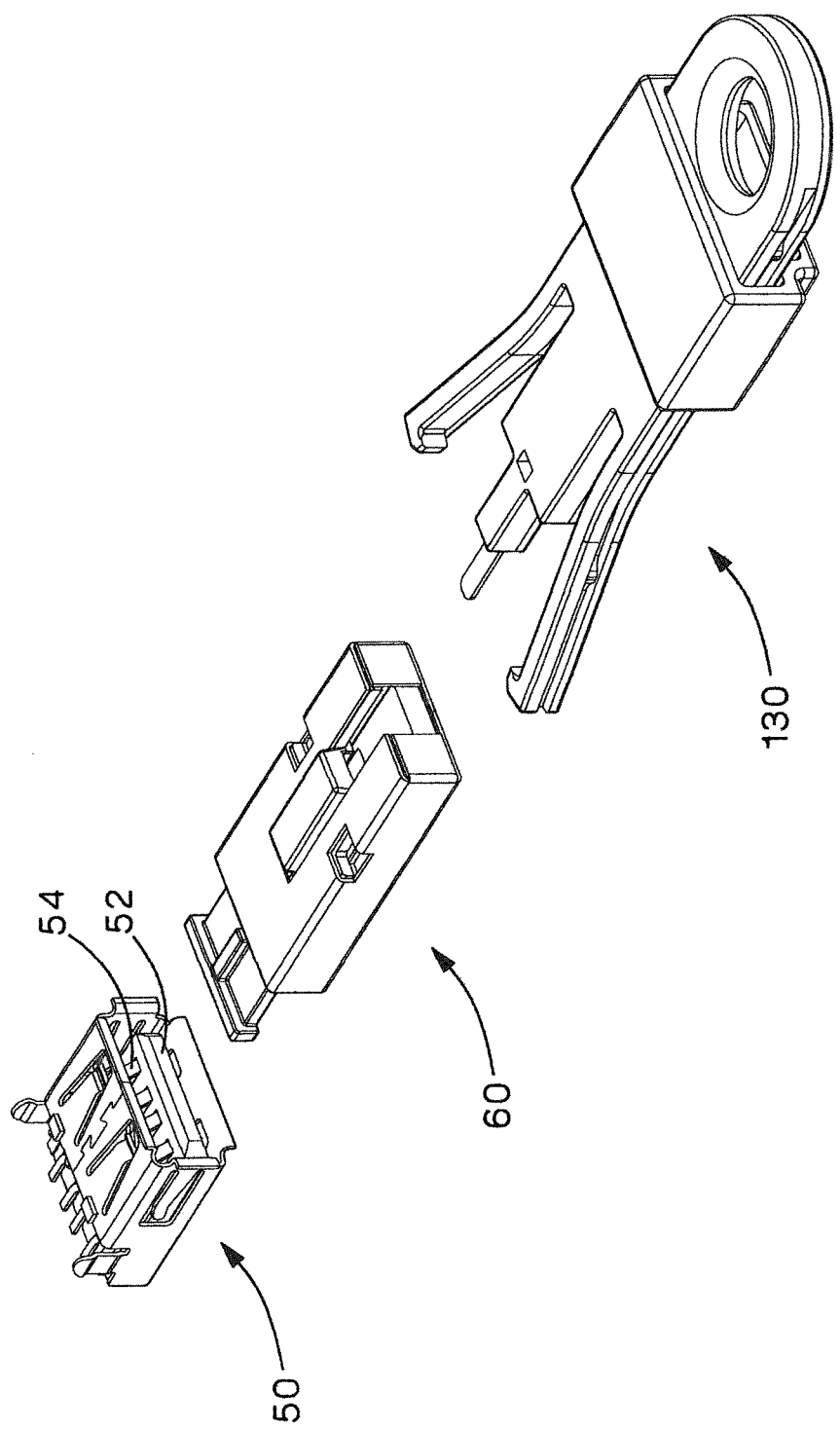
FIG. 1 is a top perspective view of a USB port, a USB blockout device and a removal tool of the present invention.
Figure 2:
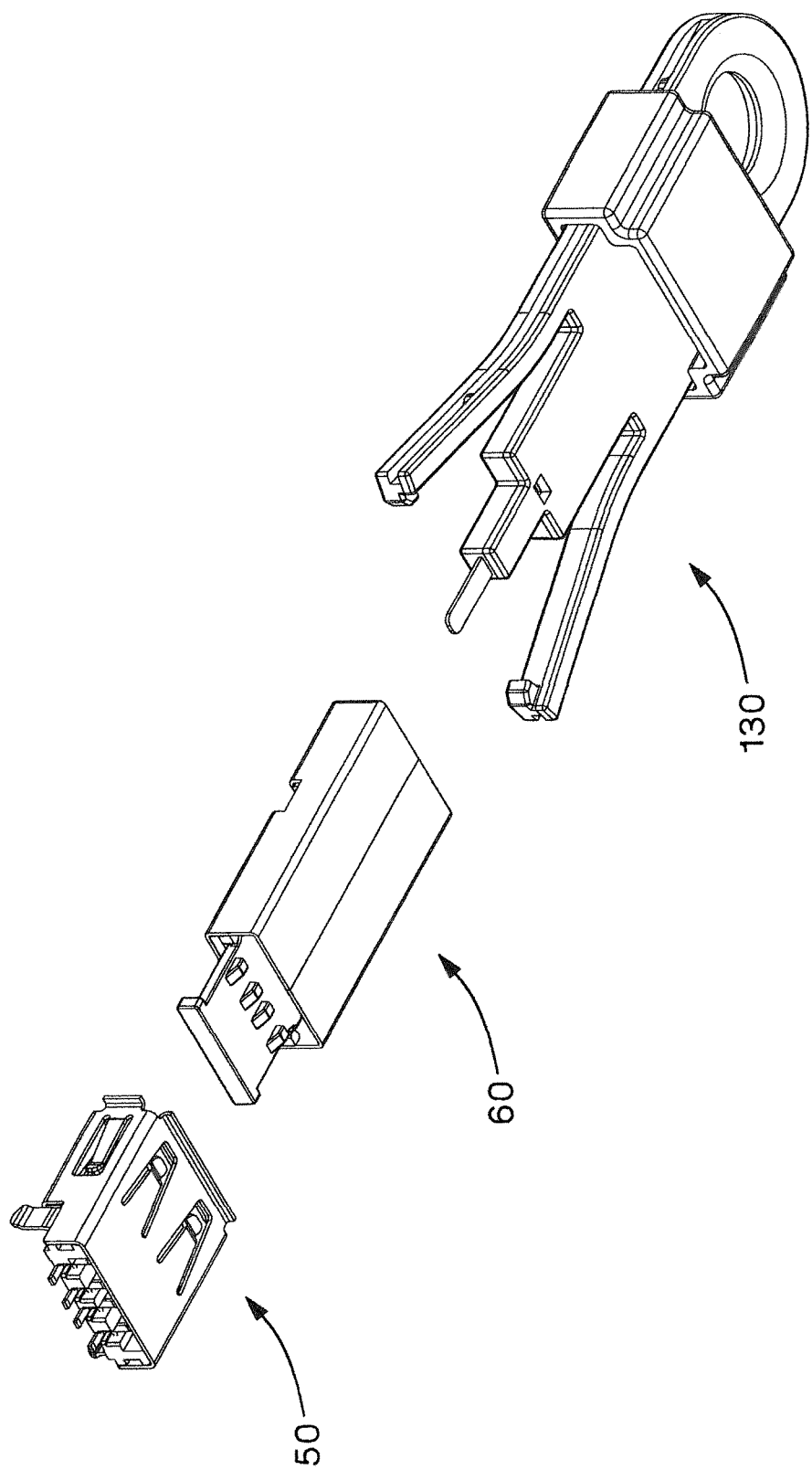
FIG. 2 is a bottom perspective view of the USB port, the USB blockout device and the removal tool of FIG. 1.

FIGS. 1 and 2 illustrate a USB port 50 positioned to receive a USB blockout device 60 and a removal tool 130 of the present invention. The USB blockout device 60 prevents contamination, damage or misuse of the USB port 50 when the USB port 50 is not being used. The USB port 50 includes a contact plate 52 with a plurality of contact slots 54. As discussed below, the USB blockout device 60 is designed to be held in the contact slots 54. The USB blockout device 60 may only be removed from the USB port 50 via the removal tool 130.

Figure 3:
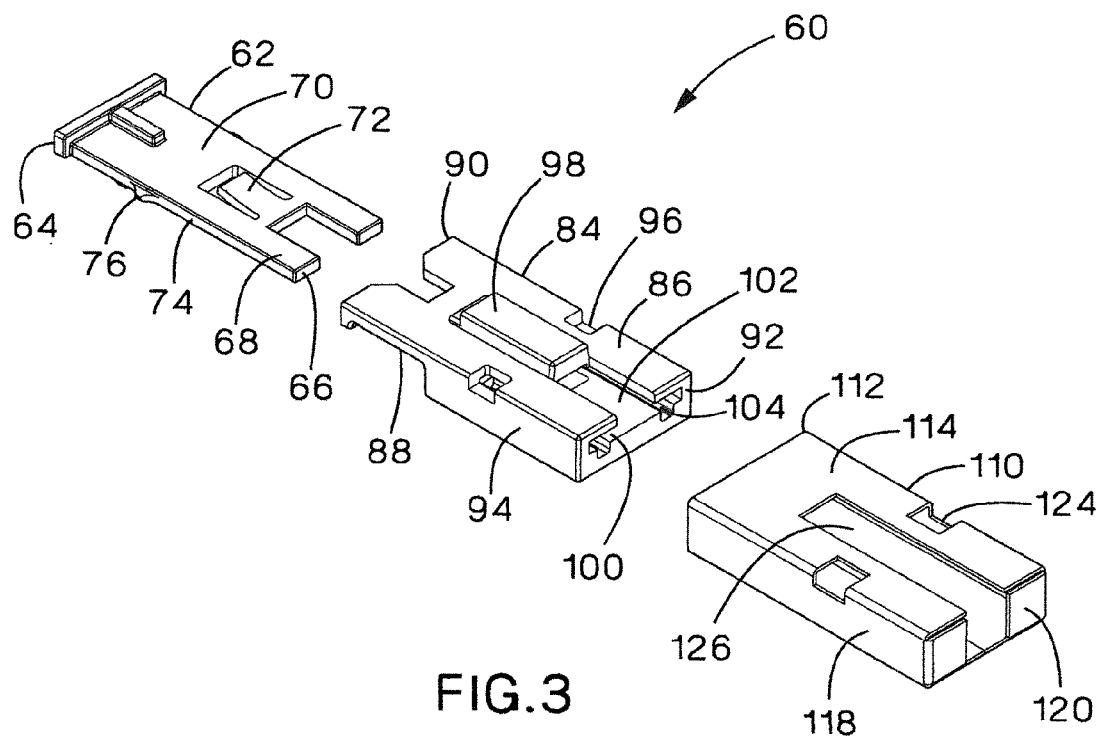
FIG. 3 is a top perspective exploded view of the USB blockout device of FIG. 1.

FIGS. 3-8 illustrate the USB blockout device 60. The USB blockout device 60 includes a slide 62, a body 84 and a metal shell 110. As illustrated in FIG. 3, the slide 62 includes a front 64 and a back 66 with legs 68. The top 70 of the slide 62 includes a molded latch 72. The molded latch 72 is deflectable to extend upwards above the top 70 of the slide 62. The slide 62 includes sides 74 with outwardly extending projections 76 that limit the movement of the slide 62 within the body 84 of the blockout device 60.

Figure 4:
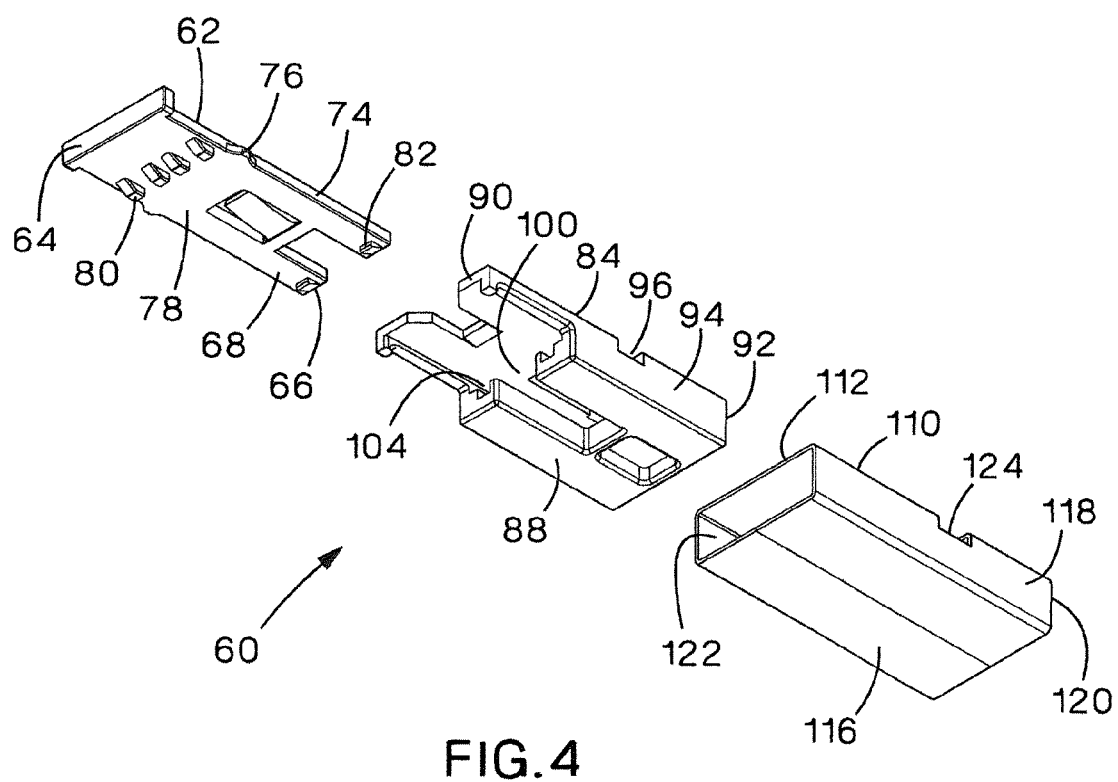
FIG. 4 is a bottom perspective view of the USB blockout device of FIG. 3.

As illustrated in FIG. 4, the bottom 78 of the slide 62 includes a plurality of molded teeth 80. As will be discussed with respect to FIGS. 11-14, the molded teeth 80 are positioned in the contact slots 54 in the contact plate 52 of the USB port 50 to secure the blockout device 60 in place.

FIG. 4 also illustrates the legs 68 of the slide 62 having a projection 82 extending downwardly from each leg 68. The projections 82 extending from the legs 68 limit the movement of the slide 62 with respect to the body 84.

The body 84 of the USB blockout device 60 includes a top 86, a partially open bottom 88, front 90, back 92 and sides 94. The body 84 includes removal tool attachment slots 96 located along the top 86 and side 94 of the body 84. The removal tool attachment slots 96 are positioned near the center of the body 84. The top 86 of the body 84 also includes a raised shoulder 98.

The bottom 88 of the body 84 defines a channel 100 designed to receive the slide 62. The channel 100 includes a first portion 102 (FIG. 3) and a second portion 104 (FIG. 4). The first portion 102 of the channel 100 defines a rectangular opening that receives the metal tongue 136 of the removal tool 130 (see FIGS. 15 and 16). As illustrated in FIG. 4, the second portion 104 receives the legs 68 of the slide 62 with the downwardly extending projections 82. The body 84 also includes a pocket 106 located under the shoulder 98 (see FIG. 10) for receiving the molded latch 72 of the slide 62.

The metal shell 110 of the USB blockout device 60 includes an open front end 112, a top 114, a bottom 116, sides 118 and a back end 120 defining a cavity 122 therein. The metal shell 110 is designed to receive the body (see FIGS. 6-8). The metal shell 110 includes removal tool attachment slots 124 located along the top 114 and sides 118 of the metal shell 110. The metal shell 110 also includes a center slot 126 extending from approximately the center of the metal shell 110 to the back end 120. Thus, when the body 84 is installed in the metal shell 110 the removal tool attachment slots 96, 124, respectively, align and the shoulder 98 of the body 84 is positioned in the center slot 126. The shoulder 98 extends above the top 114 of the metal shell 110.

Figure 5:
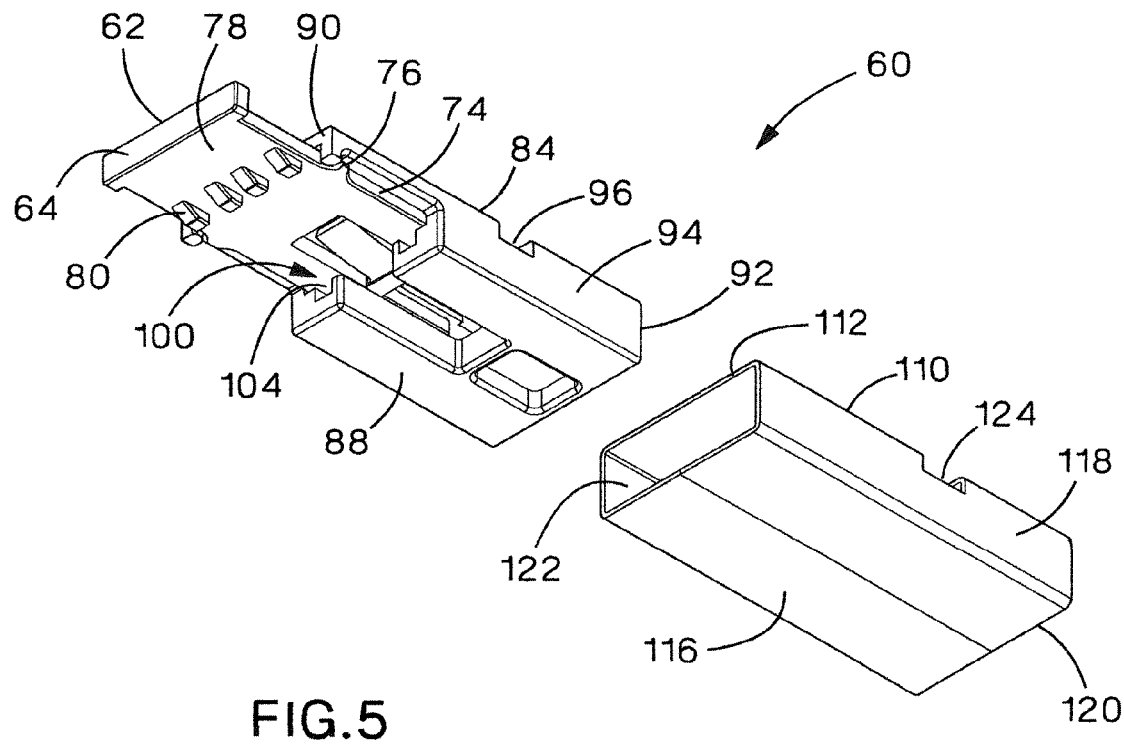
FIG. 5 is a partially assembled bottom perspective view of the USB blockout device of FIG. 4.
Figure 6:
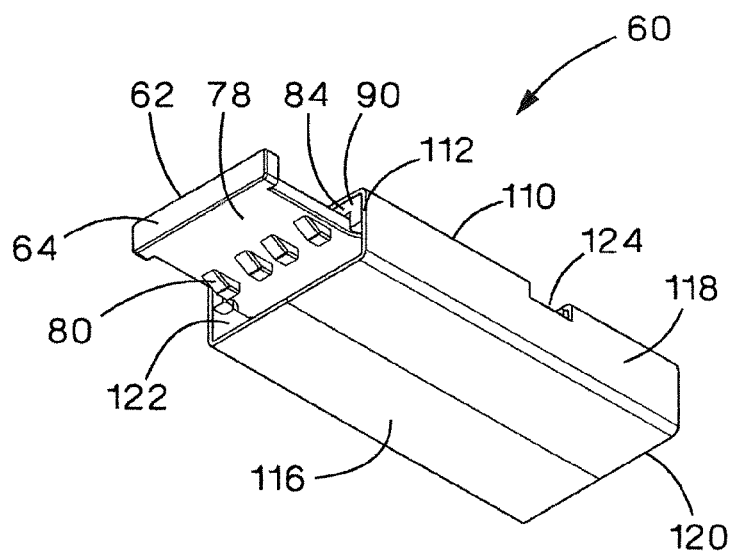
FIG. 6 is an assembled bottom perspective view of the USB blockout device of FIG. 5 in an unlatched position.
Figure 7:
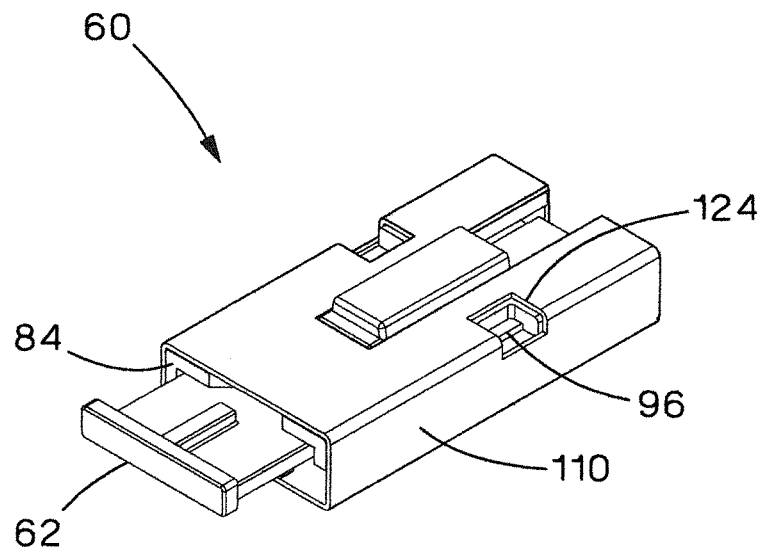
FIG. 7 is a top perspective view of the USB blockout device of FIG. 6.
Figure 8:
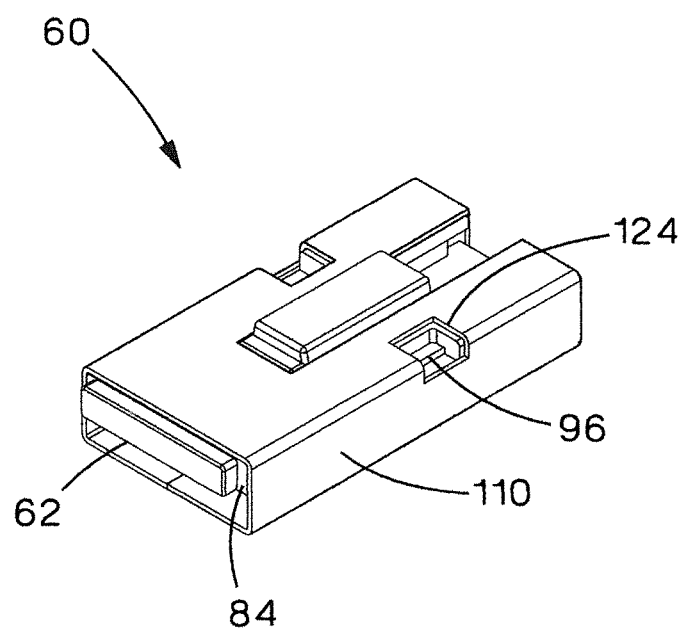
FIG. 8 is a top perspective view of the USB blockout device of FIG. 7 in a latched position.

As illustrated in FIG. 5, the slide 62 is positioned in the body 84 in an unlatched position. The projections 76 extending from the sides 74 of the slide 62 engage the front 90 of the body 84 to limit the movement of the slide 62. As illustrated in FIGS. 6 and 7, the metal shell 110 is installed over the body 84 until the removal tool attachment slots 124, 96, respectively, align. FIG. 8 illustrates the slide 62 in a latched position with respect to the body 84 and metal shell 110 of the USB blockout device 60.

FIGS. 9 and 10 illustrate the USB blockout device 60 in an unlatched position with the slide 62 extending past the front 90 of the body and the front end of the metal shell 110. The unlatched USB blockout device 60 is positioned to be installed in the USB port 50.

FIGS. 11 and 12 illustrate the unlatched USB blockout device 60 positioned in the USB port 50. The molded teeth 80 of the slide 62 are positioned on the contact slots 54 of the USB port 50 to secure the USB blockout device 60 to the USB port 50. The molded latch 72 of the slide 62 engages the top 86 of the body 84.

Figure 13:
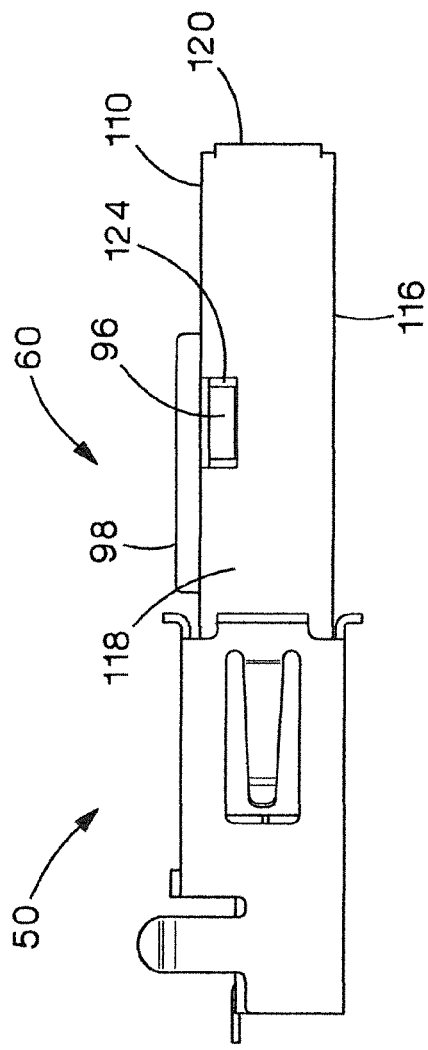
FIG. 13 is a side view of the USB blockout device of FIG. 11 completely installed in the USB port.
Figure 14:
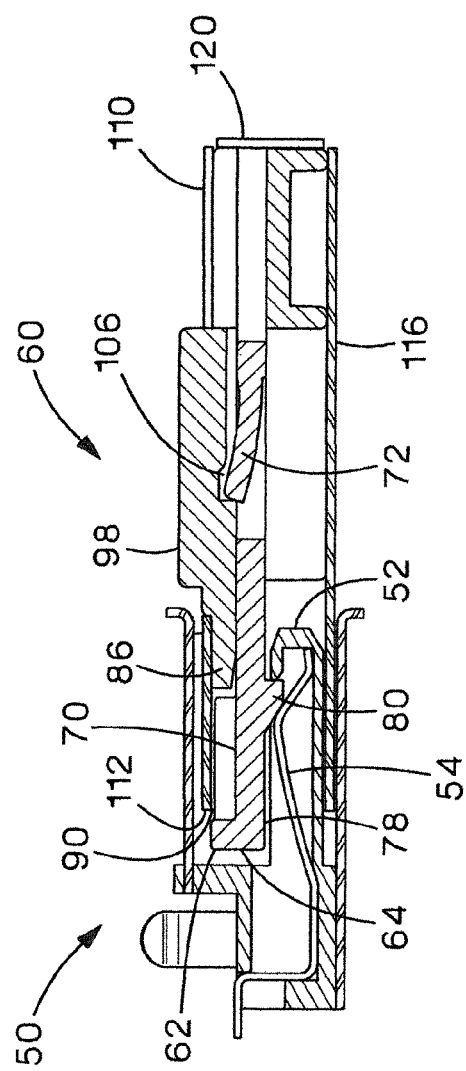
FIG. 14 is a cross sectional view of the USB blockout device of FIG. 13 completely installed in the USB port.

FIGS. 13 and 14 illustrate the USB blockout device 60 in the latched position and fully installed in the USB port 50. When the USB blockout device 60 is latched, the molded latch 72 of the slide 62 extends into the pocket 106 in the body 84. The USB blockout device 60 is secured to the USB port 50. The USB blockout device 60 may only be removed from the USB port 50 via the removal tool 130. As a result, the tamper resistant USB blockout device 60 protects the USB port 50 from contamination, damage or misuse.

FIGS. 15-20 illustrate the removal tool 130 being installed in the USB blockout device 60 and removing the USB blockout device 60 from the USB port 50. The removal tool 130 includes a metal tongue 136 and deflectable arms 140 with inwardly extending projections 142. The metal tongue 136 of the removal tool 130 is inserted in the center slot 126 of the metal shell 110 and under the shoulder 98 of the body 84 into the blockout device 60. As illustrated in FIG. 16, when the removal tool 130 is fully inserted in the blockout device, the metal tongue 136 is positioned under the shoulder 98 and a portion of the removal tool 130 is positioned in the first portion 102 of the channel 100 in the body 84 and the center slot 126 of the metal shell 110.

Figure 17:
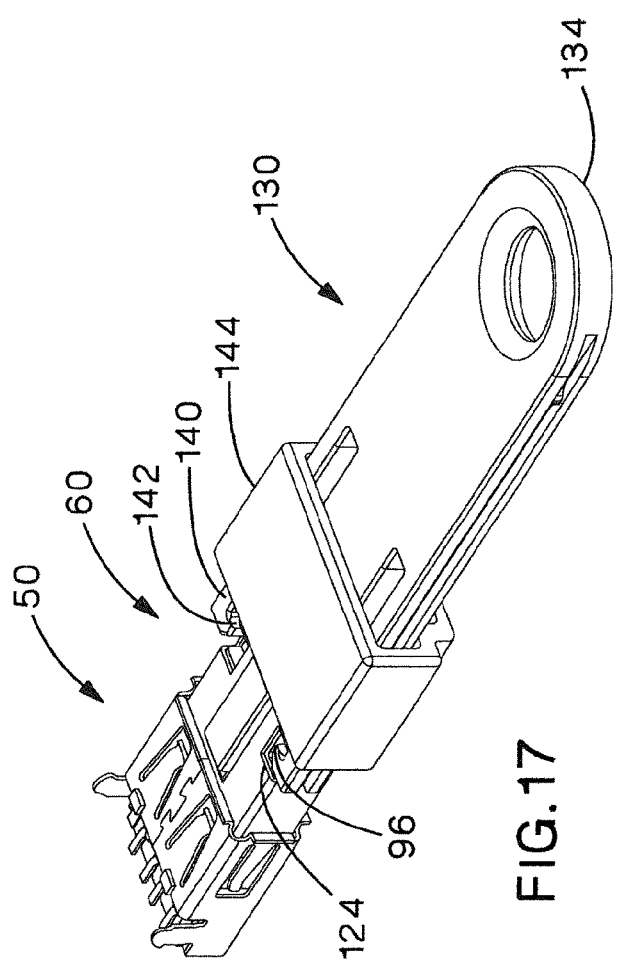
FIG. 17 is a top perspective view of the USB blockout device of FIG. 16 completely installed in the USB port with the removal tool secured to the USB blockout device.

Also when the metal tongue 136 of the removal tool 130 is installed in the USB blockout device 60, the deflectable arms 140 are positioned at the removal tool slots 96, 124 of the body 84 and the metal shell 110, respectively. The tool slide 144 is slid toward the front 132 of the removal tool 130 engaging the deflectable arms 140 and forcing the deflectable arms 140 into the removal tool slots 96, 124 as illustrated in FIG. 17. The tool slide 144 compresses the deflectable arms inwards so that the inwardly extending projections 142 are disposed in the removal tool slots 96, 124. Once the tool slide 144 is positioned over the deflectable arms 140, the removal tool 130 is secured to the USB blockout device 60.

Figure 18:
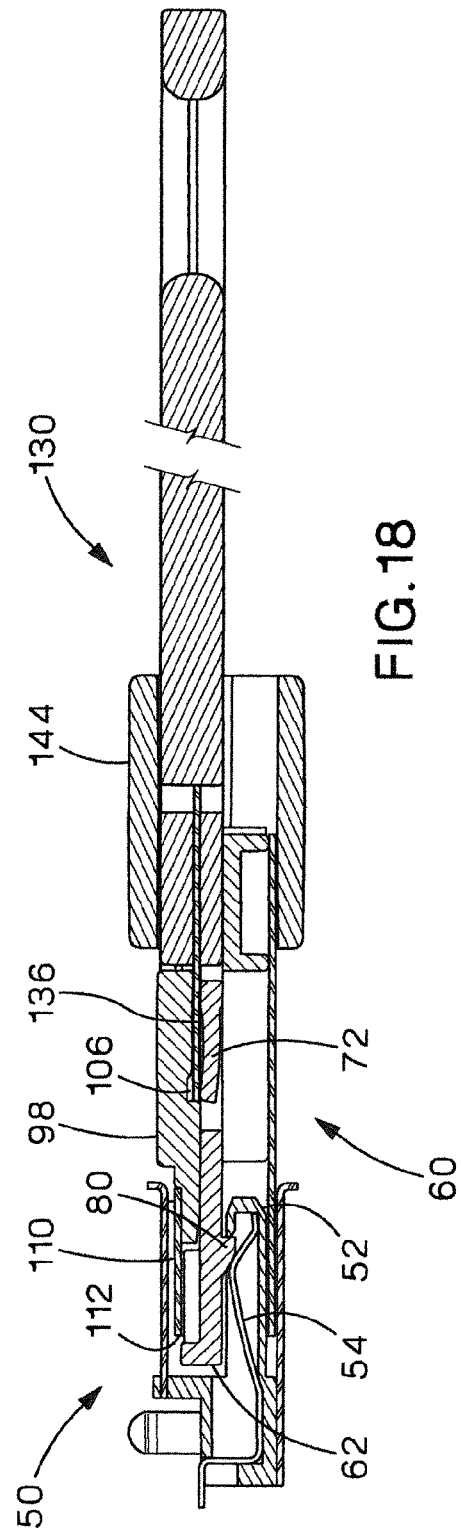
FIG. 18 is a cross sectional view of the USB blockout device of FIG. 17 installed in the USB port with the removal tool secured to the USB blockout device.
Figure 21:
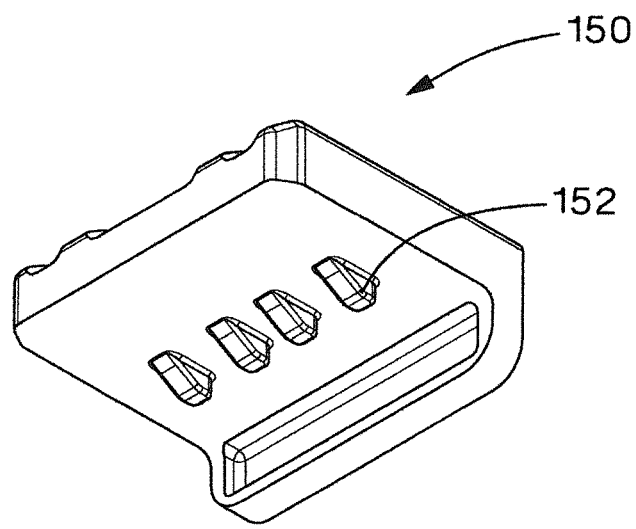
FIG. 21 is a bottom perspective view of a permanent USB blockout device of the present invention.
Figure 22:
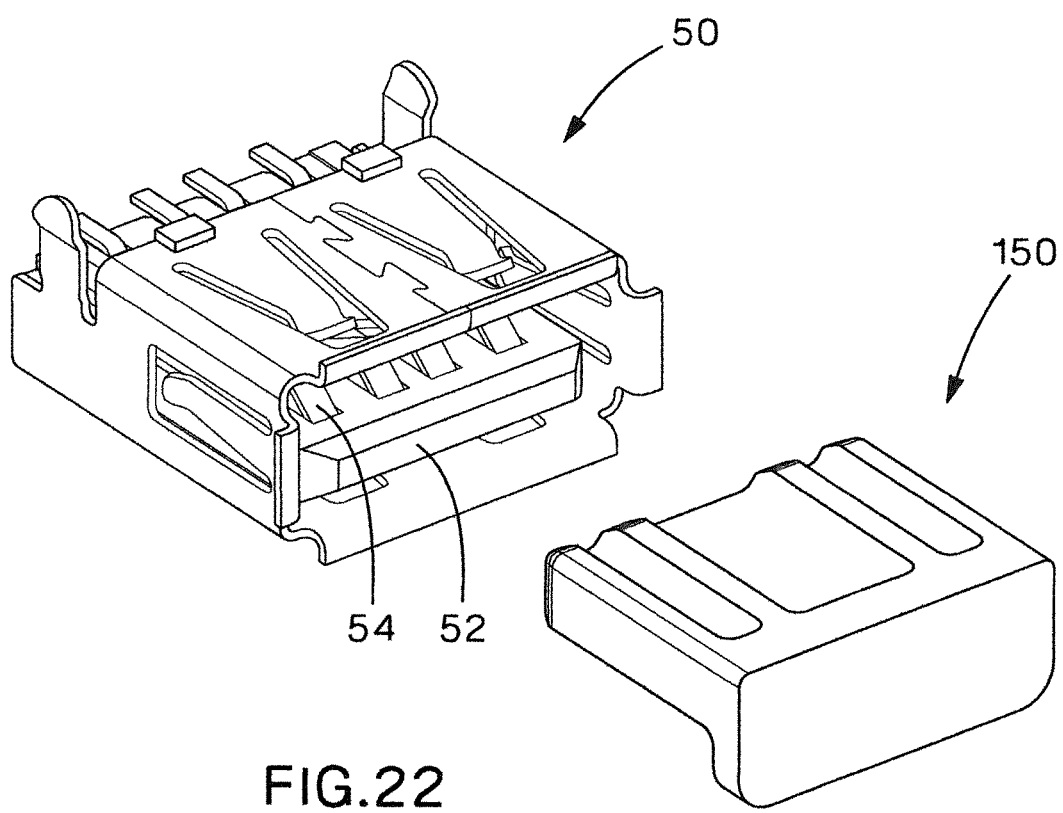
FIG. 22 is a top perspective view of the permanent USB blockout device of FIG. 21 to be installed in a USB port.
Figure 23:
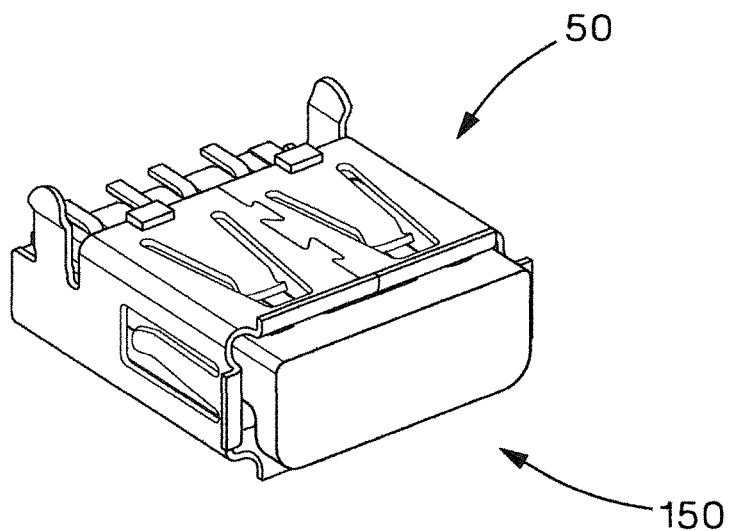
FIG. 23 is a top perspective view of the permanent USB blockout device of FIG. 22 installed in the USB port.

As illustrated in FIG. 18, when the metal tongue 136 enters the body 84 under the shoulder 98, the metal tongue 136 engages the molded latch 72 of the slide 62 and forces the molded latch 72 out of the pocket 106 of the body 84. When the removal tool 130 is fully installed in the blockout device 60, the metal tongue 136 covers the pocket 106 preventing the molded latch 72 from deflecting upwards. As a result, the blockout device 60 can be removed from the USB port 50.

FIGS. 19 and 20 illustrate the removal tool 130 removing the USB blockout device 60 from the USB port 50. Once the molded latch 72 is released, the body 84 and metal shell 110 can slide out of the USB port 50 thereby allowing the molded teeth 80 to be lifted out of the contact slots 54. After the blockout device 60 has been removed from the USB port 50, the tool slide 144 can be slid toward the back 134 of the removal tool 130 to release the deflectable arms 140 of the removal tool 130 from the blockout device 60. The removal tool 130 may then be removed from the blockout device 60.

FIGS. 21-24 illustrate a permanent USB blockout device 150. The permanent USB blockout device 150 is installed in a USB port 50 to prevent use of the electronic device via the USB port 50, when desired. The permanent USB blockout device 150 is not intended to be removed from the USB port 50 with a key or any other removal tool. Thus, the blockout device 150 would be installed once to prevent use of the USB port 50.

Figure 24:
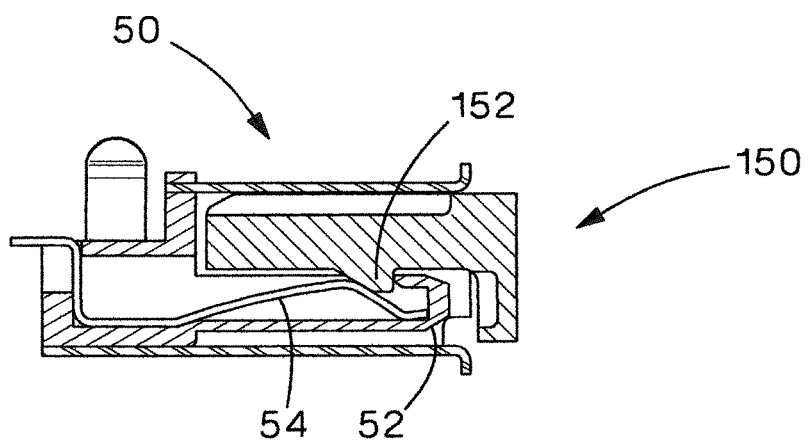
FIG. 24 is a cross sectional view of the permanent USB blockout device of FIG. 23 installed in the USB port.

Similar to the slide 62 discussed above with respect to the USB blockout device 60, the permanent USB blockout device 150 includes a plurality of molded teeth 152. The molded teeth 152 are positioned on the contact slots 54 of the USB port 50. When installing the permanent blockout device 150, the electrical contact plate 52 is deflected downward due to the interference of the molded teeth 152. As illustrated in FIG. 24, after the blockout device 150 is completely installed, the electrical contact plate 52 returns to its original position and blocks the blockout device 150 from being removed.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A blockout device for a USB port, the blockout device comprising:
   a locking member having a bottom and a top, the bottom including a plurality of teeth for engaging the USB port;
   a body member receiving the locking member, the body member having a top, a bottom and sides defining a channel therein;
   a shell having a cavity for receiving the locking member and the body member;
   whereby the locking member and the body member are positioned within the cavity of the shell when the blockout device is installed in the USB port; and
   a removal tool for removing the blockout device from the USB port, the removal tool including a front, a back, deflectable arms for engaging slots in the shell and the body member, and a slide that moves from the back of the tool toward the front of the tool, the slide engages the deflectable arms to compress the deflectable arms into the slots in the shell and the body member.

2. The blockout device of claim 1, wherein the top of the locking member having a latch, wherein the latch deflects upwards above the top of the locking member for engaging the body member.

3. The blockout device of claim 2, wherein the top of the body member includes a pocket for receiving the latch of the locking member.

4. The blockout device of claim 1, wherein the locking member includes legs having a projection extending downwardly from each leg.

5. The blockout device of claim 4, wherein the channel of the body member receives the legs of the locking member.

6. The blockout device of claim 1, wherein the locking member having sides with outwardly extending projections for limiting the movement of the locking member within the body member.

7. The blockout device of claim 1, wherein the body member further includes a shoulder extending above the top of the body member, the shoulder includes a pocket located within the channel of the body member.

8. The blockout device of claim 1, wherein the channel of the body member includes a first portion for receiving the removal tool and a second portion for receiving the locking member.

9. The blockout device of claim 1, wherein the shell includes a top, a bottom, sides, a back end and an open front end.

10. The blockout device of claim 9, wherein the shell further includes a center slot for receiving the body member.

11. The blockout device of claim 1, wherein the deflectable arms including inwardly extending projections.

12. The blockout device of claim 1, wherein the removal tool further comprising a metal tongue, the metal tongue extends from the front of the removal tool, whereby the metal tongue engages a latch of the locking member when the removal tool is installed in the blockout device.

13. A blockout device for a USB port, the blockout device comprising:
   a locking member having a bottom and a top, the bottom including a plurality of teeth for engaging the USB port;
   a body member receiving the locking member, the body member having a top, a bottom and sides defining a channel therein;
   a shell having a cavity for receiving the locking member and the body member,
   whereby the locking member and the body member are positioned within the cavity of the shell when the blockout device is installed in the USB port; and
   a removal tool for removing the blockout device from the USB port, the removal tool including a front, a back, deflectable aims for engaging slots in the shell and the body member, and a metal tongue, the metal tongue extends from the front of the removal tool, whereby the metal tongue engages a latch of the locking member when the removal tool is installed in the blockout device.

* * * * *

UNITED STATES PATENT AND TRADEMARK OFFICE
CERTIFICATE OF CORRECTION

PATENT NO.        : 8,425,249 B2
APPLICATION NO.   : 13/192212
DATED             : April 23, 2013
INVENTOR(S)       : Jason O. Hackett and Michael Scott Adams It is certified that error appears in the above-identified patent and that said Letters Patent is hereby corrected as shown below:

In the Claims
Claim 13, col. 6/Line 33: "...deflectable aims for..." should read as "...deflectable arms for..."

Signed and Sealed this
Eighteenth Day of February, 2014

Michelle K. Lee
*Deputy Director of the United States Patent and Trademark Office*